United States Patent
Mundorf et al.

[11] Patent Number: 5,642,815
[45] Date of Patent: Jul. 1, 1997

[54] STORAGE AND DISPLAY DEVICE

[75] Inventors: Larry K. Mundorf, North Canton; Christopher G. Gallagher, Akron; John P. Hoerger, Minerva; James T. Weisburn, Massillon, all of Ohio

[73] Assignee: Alpha Enterprises, Inc., North Canton, Ohio

[21] Appl. No.: 445,897

[22] Filed: May 22, 1995

[51] Int. Cl.⁶ ......................................... A47G 29/00
[52] U.S. Cl. ........................................... 211/40; D6/629
[58] Field of Search ........................ 211/40, 41, 189; 206/308.1, 308.3, 387.1, 387.12, 387.14, 387.15; D6/407, 629, 630, 631, 632; 248/126, 165

[56] References Cited

U.S. PATENT DOCUMENTS

| | | | |
|---|---|---|---|
| D. 281,207 | 11/1985 | Armbruster | D6/407 |
| D. 298,287 | 11/1988 | Stravitz | D6/407 |
| D. 307,977 | 5/1990 | Egly et al. | D3/35 |
| D. 319,741 | 9/1991 | Sylvester | D6/407 |
| D. 320,707 | 10/1991 | Garfinkle | D6/407 |
| D. 330,120 | 10/1992 | Temple et al. | D6/407 |
| D. 337,919 | 8/1993 | van der Molen | D6/407 |
| D. 345,463 | 3/1994 | Sankey et al. | D6/631 |
| D. 346,284 | 4/1994 | Lazarovic | D6/407 |
| D. 346,510 | 5/1994 | Long et al. | D6/407 |
| D. 347,959 | 6/1994 | Sankey | D6/632 |
| D. 361,011 | 8/1995 | Weisburn et al. | D6/407 X |
| D. 364,987 | 12/1995 | Chi | D6/407 X |
| D. 369,712 | 5/1996 | Sankey et al. | D6/629 |
| 2,318,501 | 5/1943 | Koch | 248/126 |
| 4,650,072 | 3/1987 | Ackeret | 206/308.1 |
| 4,728,158 | 3/1988 | D'Elia et al. | 312/108 |
| 4,927,016 | 5/1990 | Fuller | 206/315.11 |
| 5,027,955 | 7/1991 | Shoemaker, Jr. et al. | 206/308.1 X |
| 5,188,240 | 2/1993 | Marino et al. | 206/308.1 X |
| 5,195,642 | 3/1993 | Dardashti | 211/40 X |
| 5,255,802 | 10/1993 | Krinke et al. | 211/184 |
| 5,458,238 | 10/1995 | Dominguez-Gutierrez | 206/308.3 X |

*Primary Examiner*—Ramon O. Ramirez
*Assistant Examiner*—Sandra Snapp
*Attorney, Agent, or Firm*—Sand & Sebolt

[57] ABSTRACT

A device for storing and displaying a plurality of flat articles, and, in particular, recorded media such as compact discs, either in a self-supporting manner on a horizontal support surface or secured by fasteners to a vertical support surface. The device is composed of three main components, a rack, base and cover plate. The rack has a plurality of vertically spaced shelves forming slots therebetween for receiving and supporting an edge of a compact disc therein, wherein the compact disc extends in a cantilever fashion outwardly from the rack. A plurality of flexible detents on the bottom of the rack are snap-fitted into mating engagement with projections formed on the base to attach the rack to the base in a vertical upright position. A recessed channel is formed in a back wall of the rack and includes holes for receiving fasteners to secure the rack to a vertical surface when the base is removed to provide an alternate mounting arrangement for the rack. The cover plate is snap-fitted on the flexible detents of the rack to provide an attractive appearance when the rack is mounted on the vertical surface.

20 Claims, 4 Drawing Sheets

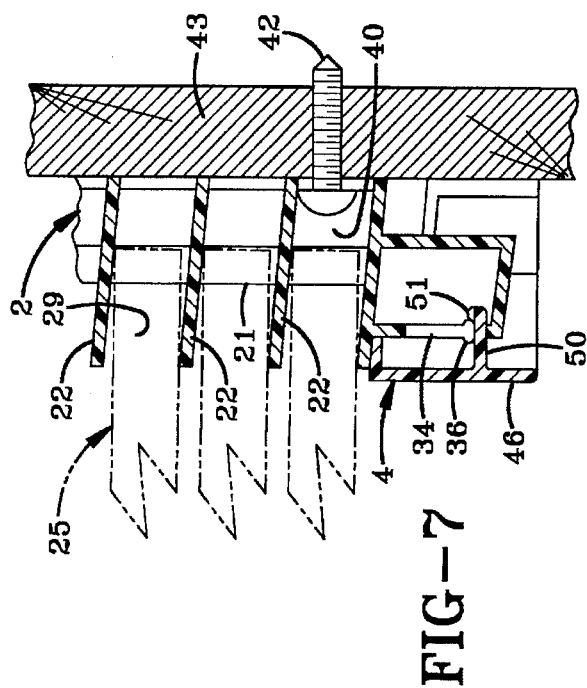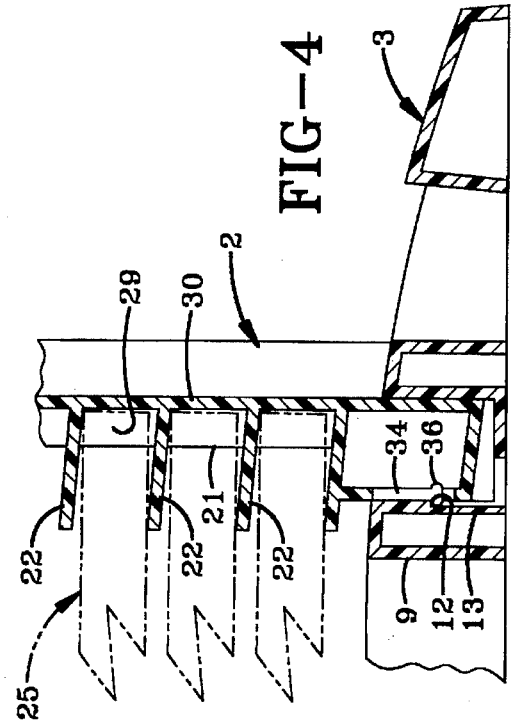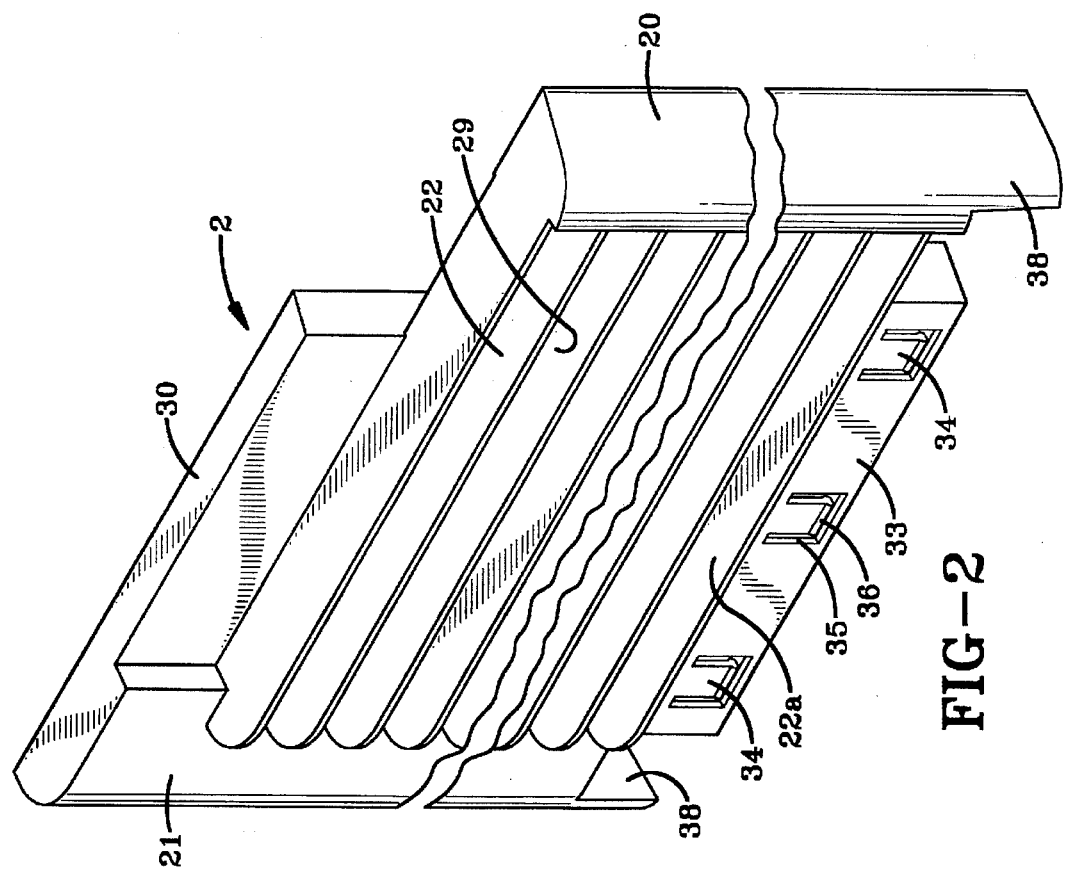

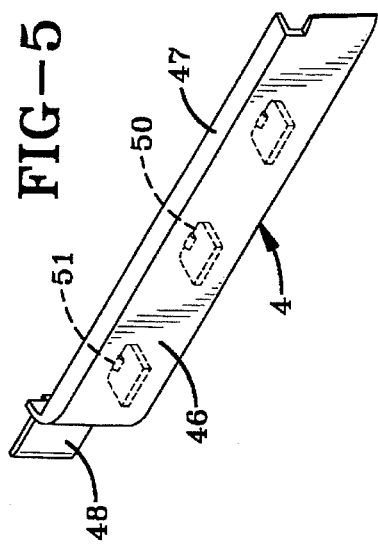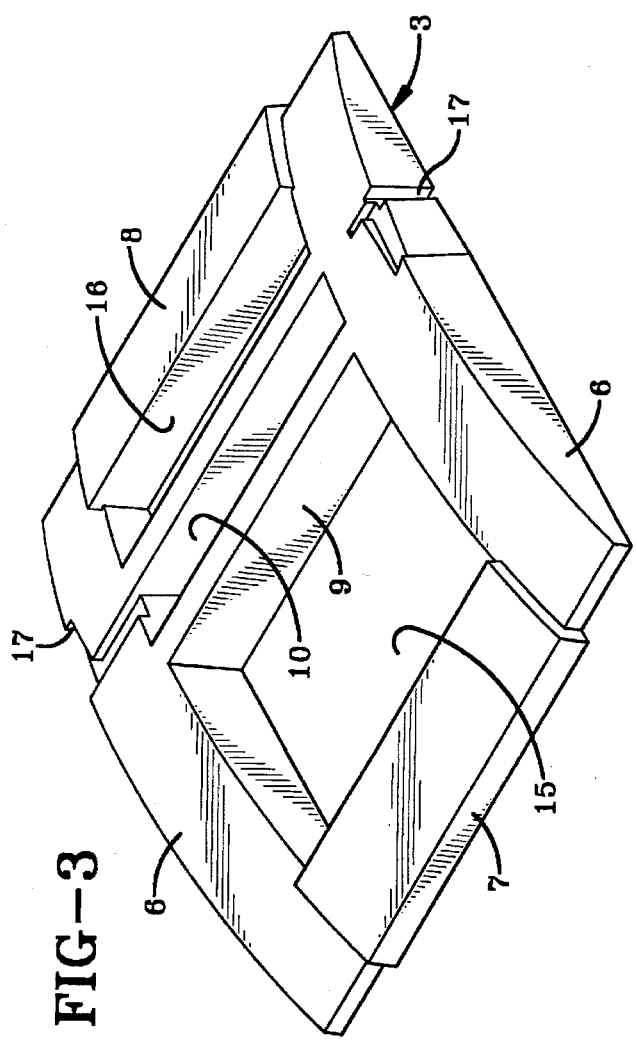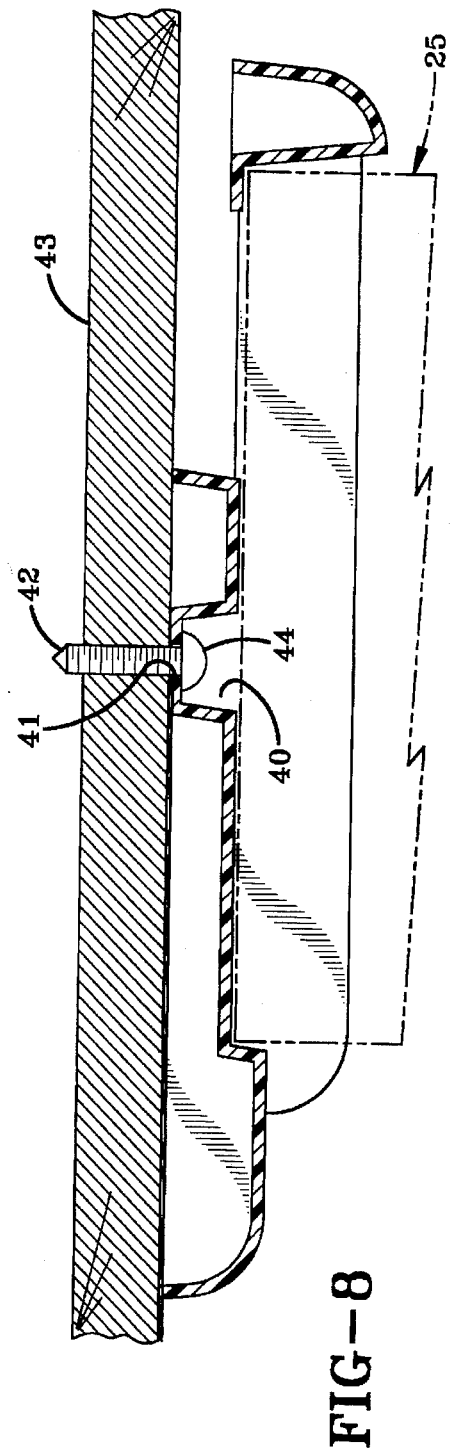

STORAGE AND DISPLAY DEVICE

BACKGROUND OF THE INVENTION

1. Technical Field

The invention relates to devices for storing and displaying relatively flat articles in a pleasing and attractive manner. More particularly, the invention relates to a device for storing and displaying recorded media such as compact discs, audiocassettes, software cards, etc., in a vertical stacked array for ease of viewing the graphics on the ends of the stored media.

Even more particularly, the invention relates to such a storage and display device for recorded media in which the rack portion thereof can be mounted on a base and supported on a horizontal surface, or attached to a vertical wall for the storing and displaying of the recorded media.

2. Background Information

The popularity of recorded media, and, in particular, compact discs, has increased considerably in recent years. Most purchasers of the compact discs desire a convenient and attractive device for the storing and displaying of the compact discs, which provides both an attractive appearance, as well as enabling the individual to view the ends of the boxes in which the compact discs are stored and conveniently read the graphics on the end of the boxes to determine the contents of the material recorded on the compact discs for selection.

Various racks have been developed for displaying various recorded media, such as shown in U.S. Pat. Nos. D-281,207, 4,728,158, D-298,287, D-307,977, 4,927,016, D-320,707, D-330,120, D-345,463, D-346,510, 5,255,802, and D-347,959, wherein the recorded media, and in particular, the rack or device holding the same, is adapted to be supported on a horizontal surface, such as a desk, shelf, table top, or the like. However, it is desirable for certain applications that the purchaser will mount the rack to a supporting wall instead of having the rack supported on a table top or other horizontal surface.

Therefore, the need exists for a device containing a rack for storing and displaying a plurality of flat articles, such as compact discs, which can be secured directly to a vertical surface or wall, or, if desired by the purchaser, can be supported on a flat horizontal surface such as a shelf or table top.

It is furthermore important in the manufacture and distribution of such storage and display devices that the device can be mass produced relatively inexpensively and stored and shipped in convenient size packages to reduce packaging costs and provide a more environmentally acceptable product and associated packaging.

Therefore, the need exists for a storage and display rack for flat articles, and, in particular, for recorded media such as compact discs, which can be mass produced relatively inexpensively and stored and shipped in flat small packages, and then easily assembled by the purchaser for use either as a shelf or table top mounted unit, or secured to a vertical wall.

SUMMARY OF THE INVENTION

Objectives of the invention include providing an improved device for storing and displaying flat articles, and, in particular, for compact discs, in a vertical array, whereby the ends of the boxes in which the compact discs are stored can be viewed for visual inspection of the graphics contained therein to determine the contents of the information recorded on the disc contained within the box.

A further objective of the invention is to provide such a device which can be mass produced relatively inexpensively, preferably by injection molding, wherein the individual components can be shipped in a relatively flat compact condition and then assembled easily by the purchaser, saving both packaging material costs, as well as storage and shipping expenses.

Another objective of the invention is to provide such a device in which the rack portion thereof, when mounted on a vertical wall, provides a pleasing appearance by having a cover plate snap-fitted on a lower portion thereof to conceal the attachment means for attaching the rack to a base when used in an upright table top position, and in which the mounting fasteners are concealed behind the stored discs.

A further objective of the invention is to provide such a device which is of a sturdy and durable construction, easily assembled by the purchaser, and which enables the purchaser to use the device at various locations within his or her residence for the attractive storage and display of compact discs, and, in particular, the boxes in which the discs are stored.

These objectives and advantages are obtained by the device of the present invention for storing and displaying a plurality of flat articles, wherein said device includes a base; a rack having a plurality of vertically spaced shelves forming a plurality of vertically spaced slots for slidably receiving the articles therein; first means for mounting the rack on the base whereby the rack is held by the base and extends upwardly from a substantially horizontal support surface on which the base is mounted; and second means for mounting the rack without the base on a substantially vertical surface.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 2 is a fragmentary front perspective view of the rack component of the device of FIG. 1 removed from the base component;

FIG. 3 is a perspective view of the base component of the storage and display device of the present invention;

FIG. 4 is a fragmentary sectional view taken on line 4—4, FIG. 1;

FIG. 5 is a perspective view of a cover plate component of the storage and display device of the present invention;

FIG. 7 is an enlarged fragmentary sectional view taken on line 7—7, FIG. 6; and

FIG. 8 is an enlarged fragmentary sectional view taken on line 8—8, FIG. 6.

Similar numerals refer to similar parts throughout the drawings.

DESCRIPTION OF THE PREFERRED EMBODIMENT

Figure 1:
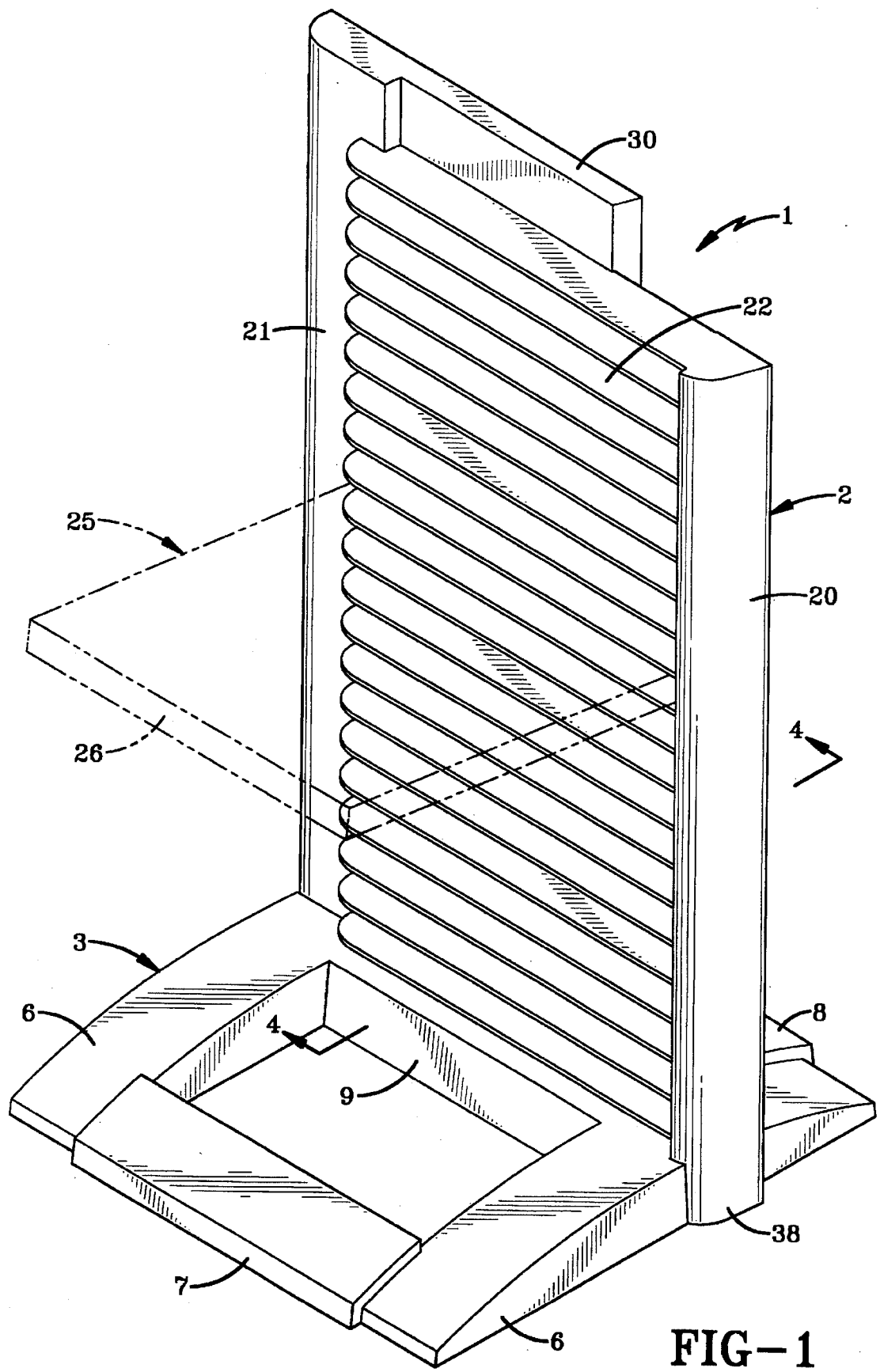
FIG. 1 is a front perspective view of the storage and display device of the present invention shown in an upright supported position, with a single compact disc being shown stored therein in dot-dash lines.

The storage and display device of the present invention is indicated generally at 1, and includes three main components, a rack 2, a base 3 and a cover plate 4, as shown particularly in FIGS. 1, 3 and 5. Each of these components can be mass produced relatively inexpensively of plastic material by injection molding. They can be molded in various colors to provide an attractive appearance when assembled in a selected position.

Referring to FIG. 3, base 3 includes a pair of arcuate-shaped side members 6, and front and rear cross members 7 and 8, respectively, which forms a stable base for receivably mounting rack 2 therein, as described below. An intermediate cross member 9 extends between side member 6, and is parallel to front and rear members 7 and 8, and is formed with a rectangular-shaped recess 10. Referring particularly to FIG. 4, a projecting shoulder 12 is formed on a vertical wall 13 which forms a portion of intermediate member 9, and extends laterally across intermediate member 9 within recess 10 for snap-mounting rack 2 therein, as described below. Base 3 thus forms a stable support for mounting the device on a flat horizontal surface, such as a table top, shelf or the like. Open portions 15 and 16 are formed in base 3 between intermediate cross member 9 and front and rear members 7 and 8, respectively, to save material costs and weight, and to facilitate the molding of device 1. The interiors of the base-forming members preferably are hollow, as shown in FIG. 4, to save material costs. A pair of grooves 17 is formed in an outer surface of each side member 6 for slidably receiving a portion of rack 2 therein.

Rack 2 is best shown in FIGS. 2, 4, 6 and 8. Rack 2 includes a pair of side walls 20 and 21, and a plurality of flat laterally extending shelves 22 formed integrally therewith and extending horizontally therebetween. Shelves 22 preferably are formed at an angle of between 5° and 10° with respect to the horizontal, with the preferred angle between approximately 7°, as shown in FIGS. 4 and 7. This angulation enables the compact discs or other stored articles, and, in particular, the storage boxes in which the discs are stored, indicated at 25, which are referred to in the industry as "jewel boxes," to extend outwardly in a cantilever fashion at an angle of approximately 5°. This exposes a front end 26 thereof (FIG. 1) for ease of viewing of the graphics contained therein, which is visible through the transparent material from which jewel boxes 25 are usually formed. Thus, when a plurality of jewel boxes or other articles are stored in rack 2, the end walls 26 will be exposed and readily visible to an individual desiring to make a particular selection from the plurality of compact discs contained within the jewel boxes.

Figure 6:
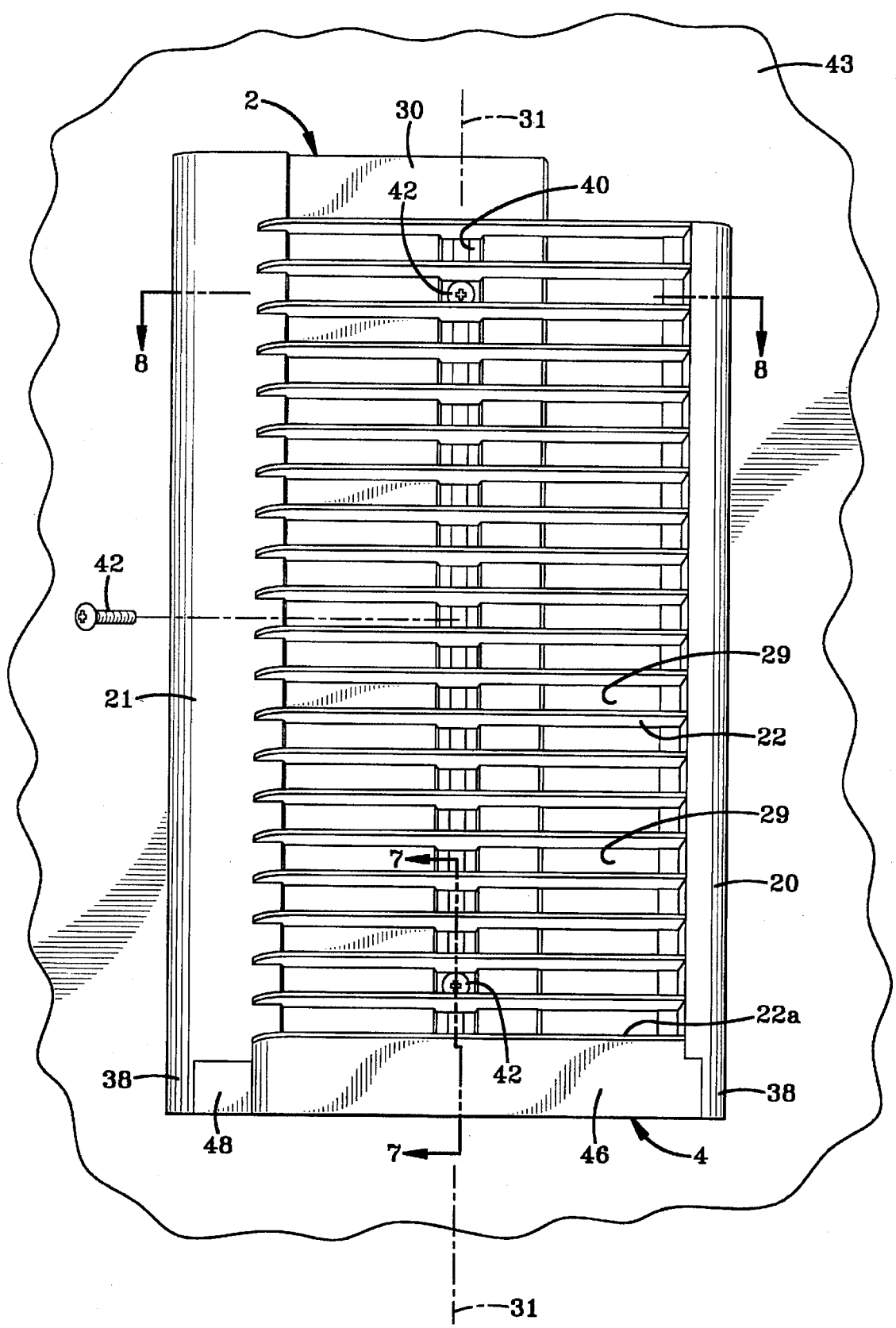
FIG. 6 is a front elevational view of the rack being secured to a vertical supporting wall.

As shown particularly in FIGS. 4 and 7, each pair of adjacent shelves 22 forms an intervening slot 29 in which is slidably received an inner end of a compact disc, and, in particular, the jewel box thereof, whereby the jewel box extends in a cantilever fashion outwardly therefrom, as shown in FIGS. 1, 4 and 6. Rack 2 further includes a back wall 30 which is formed integrally with side wall 21 and extends throughout a portion of the rear of shelves 22 to a location beyond an imaginary center line 31 of the rack, as shown particularly in FIG. 6. Back wall 30 functions as a stop to limit the insertion of jewel boxes 25 therein, as shown in FIGS. 4 and 7, in addition to providing rigidity to the rack.

A mounting block 33 (FIG. 2) is formed integrally with and extends downwardly from the bottommost shelf 22a of storage rack 2, and is formed with a plurality of flexible detents 34 which are located within U-shaped slots 35. As shown in FIGS. 4 and 7, each detent 34 is formed with an enlarged distal edge 36 which is snap-fitted into engagement with projecting shoulder 12 of intermediate member 9 of base 3, providing a snap-fit mounting of rack 2 within base recess 10. The lower ends 38 of side walls 20 and 21 of rack 2 extend beyond lower shelf 22a and are in alignment with mounting block 33, and are slidably received within grooves 17 of rack side members 6, and in combination with the snap-fit mounting of mounting block 33 in base recess 10, provide a secure, firm snap-fit engagement between rack 2 and base 3 to securely mount rack 2 in a vertically upright-extending position from base 3, as shown in FIGS. 1, 4 and 7.

Thus, when the purchaser of device 1 desires to use the device on a table top, shelf or other horizontal supporting surface, rack 2 is snap-fitted and inserted into base recess 10, which then provides a device consisting of rack 2 and base 3 for storing and displaying a plurality of compact discs in their individual jewel boxes 25, or other flat articles, as shown particularly in FIG. 1.

In accordance with another of the features of the invention, a U-shaped channel 40 is formed in back wall 30 (FIGS. 6 and 8) and extends generally throughout the entire length thereof and forms a recess therein. A plurality of holes 41 are formed at selected points along the length of channel 40 for receiving one or more fasteners 42 for securing rack 2 to a vertical supporting wall 43 or similar supporting structure, whereby the rack is securely mounted thereon, as shown in FIGS. 6 and 8. The fastener heads 44 are concealed within channel 40 and will be concealed by the stored compact discs without interference, since the rear of the jewel box will contact back wall 30, as shown in FIG. 8.

When rack 2 is mounted on a vertical supporting wall or surface, as shown in FIGS. 6 and 8, cover plate 4 is snap-fitted on mounting block 33 to conceal the mounting detents 34 and slots 35, and to provide a pleasing attractive appearance to the mounted rack, as shown particularly in FIG. 6.

Referring to FIG. 5, cover plate 4 is an elongated relatively flat strip of plastic material having a generally planar front surface 46 and a rearwardly extending top flange 47 and an outwardly extending side flange 48 formed at one end thereof. A plurality of latching projections 50 extend outwardly from the rear surface of cover plate 4 and are provided with locking nubs 51 on the distal ends thereof. Cover plate 4 is snap-fitted into engagement on mounting block 33 of rack 2, with projections 50 (FIG. 7) snap-fittingly engaging flexible detents 34, with nubs 51 engaging enlarged distal edges 36 of detents 34, to securely mount cover plate 4 along the front of mounting block 33. Cover plate 4 conceals the locking detents formed on block 33, and provides a pleasing appearance to the rack when mounted on a vertical surface. Thus, the mounting means, and, in particular, flexible detents 34 which enable rack 2 to be snap-fitted into engagement with base 3, also function as the attachment means or latching members for securing cover plate 4 on rack 2.

Thus, when device 1 is used on a horizontal supporting surface, as shown in FIG. 1, rack 2 and base 3 are utilized, and when the device is adapted to be supported on a vertical wall, as shown in FIG. 6, rack 2 and cover plate 4 are utilized. Thus, improved storage and display device 1 enables the purchaser thereof to use the device for storing and displaying flat articles, such as compact discs, audiocassettes, software discs, etc., either as a table top mounted unit, as shown in FIG. 1, or as a wall mounted unit, as shown in FIG. 6. In either mounting position, the device provides an attractive unit regardless of its manner of use, with the attachment means for securing the rack to the base being concealed by an attractive cover plate 4 when used in a wall mounted manner. In either position, rack 2 provides a plurality of vertically spaced shelves with intervening slots for slidably receiving a plurality of articles, and, in particular, jewel boxes containing compact discs therein. The scope of protection need not be limited to compact discs, since device 1 can be used for other relatively flat, elongated articles without affecting the concept of the invention and the advantages achieved thereby.

Accordingly, the storage and display device of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved storage and display device is constructed and used, the characteristics of the construction, and the advantageous, new and useful results obtained; the new and useful structures, devices, elements, arrangements, parts and combinations, are set forth in the appended claims.

We claim:

1. A device for storing and displaying a plurality of recorded media, including:

a base;

a rack having a plurality of vertically spaced shelves forming a plurality of vertically spaced slots for slidably receiving the recorded media therein; first means for mounting the rack on the base whereby the rack is held by the base and extends upwardly from a substantially horizontal support surface on which the base is mounted;

second means for mounting the rack without the base on a substantially vertical surface; and a cover plate adapted to be mounted on a lower end of the rack when said rack is mounted on the vertical surface by the second means.

2. The device defined in claim 1 in which the cover plate includes at least one latching member; and in which said latching member is engaged with a second latching member formed on the lower end of the rack.

3. The device defined in claim 2 in which the said one latching member of the cover plate is a plurality of projections extending outwardly from a rear surface of said cover plate; and in which the second latching member is a plurality of flexible detents which form a snap-fit engagement with the cover plate projections.

4. The device defined in claim 1 in which the base, rack and cover plate are each one-piece members.

5. The device defined in claim 4 in which the base, rack and cover plate are formed of molded plastic.

6. The device defined in claim 1 in which the first means is at least one flexible detent formed on one of the rack and base, and a matingly engageable projection formed on the other of the rack and base, said detent and projection forming a snap-fit engagement.

7. The device defined in claim 1 in which the second means includes a recess formed in a back wall of the rack and an opening formed through said recess, and a fastener extending through the opening.

8. The device defined in claim 1 in which the rack includes a pair of spaced parallel sidewalls and a back wall extending from one of the sidewalls and past an imaginary centerline of the rack.

9. The device defined in claim 1 in which the shelves are elongated flat strips inclined upwardly at an angle of between 5° and 10°.

10. The device defined in claim 1 in which the first mounting means is at least one flexible detent formed on a lower end of the rack; and in which the cover plate is formed with at least one projection which matingly engage the flexible detent to mount said cover plate on the lower end of the rack.

11. The device defined in claim 10 in which a plurality of flexible detents are formed on the lower end of the rack; and in which said detents are flat flexible strips located within U-shaped openings formed in said lower end.

12. The device defined in claim 1 in which the base is formed with an elongated recess; and in which a lower end of the rack is seated within the base recess and retained therein by the first means.

13. A device for storing and displaying a plurality of flat articles in a spaced vertical array selectively on horizontal and vertical support surfaces; said device including:

a base;

a rack having a plurality of spaced shelves for supporting the flat articles in a cantilever fashion;

first means for selectively mounting the rack on the base whereby the rack is held by the base and extends upwardly from a substantially horizontal support surface on which the base is mounted;

second means for selectively mounting the rack without the base on a substantially vertical surface; and a cover plate adapted to be mounted on the rack when said rack is mounted on the vertical surface to conceal a portion of the first means formed on the rack.

14. The device defined in claim 13 in which the base, rack and cover plate are each an integral one-piece, plastic member.

15. The device defined in claim 13 in which certain of the first and second means includes flexible detents to selectively snap-fit the base and cover plate to the rack.

16. A device for storing and displaying a plurality of recorded media, including:

a base;

a rack having a plurality of vertically spaced shelves forming a plurality of vertically spaced slots for slidably receiving the recorded media therein;

first means for mounting the rack on the base whereby the rack is held by the base and extends upwardly from a substantially horizontal support surface on which the base is mounted;

second means for mounting the rack without the base on a substantially vertical surface; and said first means including at least one flexible detent formed on one of the rack and base, and a matingly engageable projection formed on the other of the rack and base, said detent and projection forming a snap-fit engagement.

17. A device for storing and displaying a plurality of recorded media, including:

a base;

a rack having a plurality of vertically spaced shelves forming a plurality of vertically spaced slots for slidably receiving the recorded media therein;

first means for mounting the rack on the base whereby the rack is held by the base and extends upwardly from a substantially horizontal support surface on which the base is mounted; and second means for mounting the rack without the base on a substantially vertical surface, said second means including a recess formed in a back wall of the rack and an opening formed through said recess and a fastener extending through said opening.

18. The device defined in claim 17 in which the recess extends longitudinally throughout a major portion of the back wall of the rack.

19. The device defined in claim 17 in which the recess is a generally U-shaped channel.

20. A device for storing and displaying a plurality of recorded media, including:

a base;

a rack having a plurality of vertically spaced shelves forming a plurality of vertically spaced slots for slidably receiving the recorded media therein, said base and rack each being an integral one-piece member;

first means for mounting the rack on the base whereby the rack is held by the base and extends upwardly from a substantially horizontal support surface on which the base is mounted, said first means including a plurality of mating members formed on the base and rack to form a snap-fit engagement therebetween; and second means for mounting the rack without the base on a substantially vertical surface, said second means including openings formed in the rack and a plurality of fasteners extending through said openings.

* * * * *